Nov. 25, 1952 R. J. SCHENKEL 2,619,559
LINE OPERATED FISHING SWITCH
Filed May 20, 1949
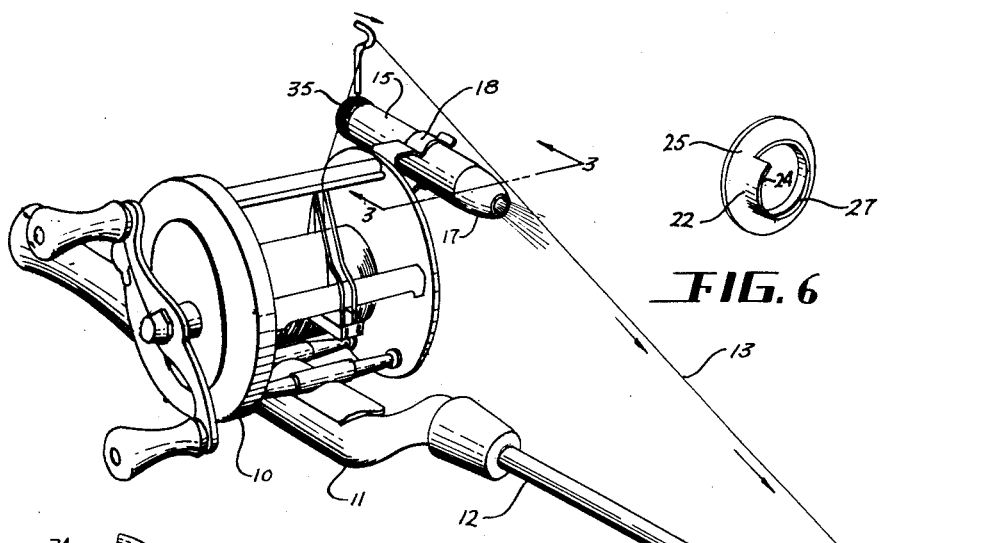
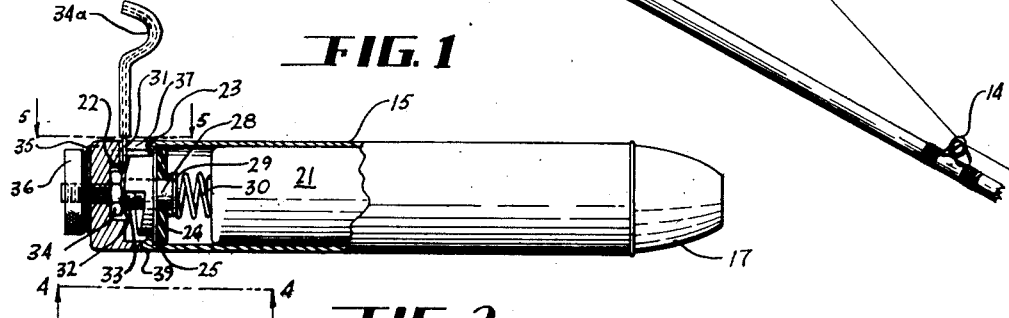
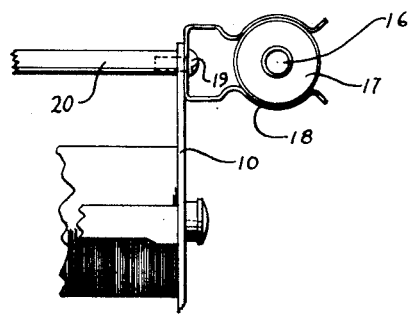
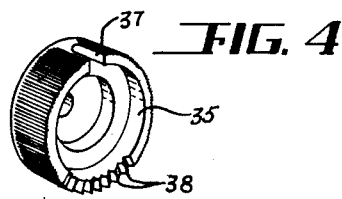
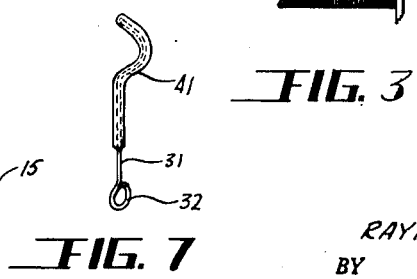
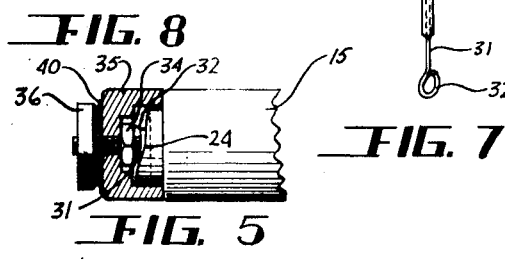
INVENTOR.
RAYMOND J. SCHENKEL
BY
HIS ATTORNEY Patented Nov. 25, 1952

2,619,559

UNITED STATES PATENT OFFICE 2,619,559

LINE OPERATED FISHING SWITCH

Raymond J. Schenkel, Dayton, Ohio

Application May 20, 1949, Serial No. 94,431

8 Claims. (Cl. 200—52)

This invention relates to a line operated fishing signal for use on a fishing rod.

One object of the invention is to provide a simple, compact signalling device adapted to be mounted on a fishing rod and including a movable member to be engaged and actuated by the fishing line to energize the signal when a pull is exerted on the line by a fish, the line being at all times free for movement with relation to the reel.

A further object of the invention is to provide an electrically operated signalling device including a movable contact member and a fixed contact member, one of which is adjustable with relation to the other to vary the amount of pull on the line necessary to energize the signal.

A further object of the invention is to provide such a signalling device including a fixed contact member having an inclined contact surface and a resilient contact member having a part to be engaged by the line and flexed into contact with the inclined edge of the fixed contact member, the resilient contact member being adjustable lengthwise of the inclined surface of the fixed contact member.

A further object of the invention is to provide such a signalling device in which the movable contact member may be normally held against adjusting movement with relation to the inclined contact surface but which can be quickly and easily adjusted.

A further object of the invention is to provide such a signalling device in which the parts are of such character that the circuit through the signal will not be closed by the simultaneous contact of the movable contact member and the casing of the device with a conducting surface.

Other objects of the invention may appear as the device is described in detail.

Fig. 1 is a perspective view of a signalling device embodying the invention and showing the same mounted on a reel which is mounted on a fishing rod; Fig. 2 is a side elevation of the signalling device, partly broken away to show the circuit closing device; Fig. 3 is an end elevation of the signalling device viewed on the line 3—3 of Fig. 1; Fig. 4 is a bottom view of the signalling device, as it appears in Fig. 2; Fig. 5 is a top plan view, partly broken away, to show the contact members; Fig. 6 is a perspective detail view of the fixed contact member; Fig. 7 is a detail view of the movable contact member; and Fig. 8 is a perspective view of the adjusting cap.

In these drawings I have illustrated the preferred embodiment of my invention but it is to be understood that the signalling device as a whole, as well as the various parts thereof, may take various forms without departing from the spirit of the invention.

The invention is here shown as mounted on one end wall of a reel 10 which in turn is mounted on a handle portion 11 of a fishing rod 12, the line 13 extending from the reel through guides, one of which is shown at 14, to the point of the rod.

In the embodiment here shown the signalling device comprises a casing 15 which is provided at one end with the signalling element, which is shown in Fig. 3 as a small lamp 16, the lamp being partially enclosed in a tubular translucent member 17 secured to the adjacent end of the casing 15. The casing may be attached to the fishing rod in various ways but preferably it is mounted on one end member of the reel and in the present arrangement a resilient clip 18 is adapted to embrace the casing and is provided with a transverse portion having an opening through which may extend one of the screws 19 which connect the end member of the reel with the transverse rods 20 thereof, thus enabling the clip to be attached to the reel by merely removing one of the screws, passing that screw through the opening in the clip and again inserting it through the end member into the rod 20, as shown in Fig. 3.

Mounted in the casing 15 is a battery 21, including one or more dry cells, with which the lamp is in electrical contact. Mounted at that end of the casing opposite the lamp is a fixed contact member 22 which is electrically connected with the battery and the lamp. In the present instance through the casing 15, which is of conducting material and is provided at its rear end with an inwardly extending flange 23. Mounted in the rear end of the casing is an insulating member 26, such as a disk of insulating material, which extends radially beyond the inner edges of the flange 23. The fixed contact member 22 in the form here shown comprises an annular and substantially cylindrical portion 24 having at its forward end a flange 25 which is confined between the flange 23 of the casing and the insulating member 26 and is thus held in electrical contact with the casing. The annular portion of the fixed contact member is provided with a spirally shaped rear edge 27. A stud 28 of conducting material extends through an opening in the insulating member 26 and through the annular contact member 22, but has no engagement with the latter. The stud 28 is rotatable in the insulating member and is electrically connected with the battery 21, as by a spring 30. Mounted on the stud in the rear of the fixed contact member is a movable contact member which is normally biased from the fixed contact member and is movable into engagement with the latter by the fishing line. Preferably this movable contact member is in the nature of a resilient rod 31 connected at its inner end with the stud 28 and extending radially therefrom across the inclined or spiral edge 27 of the fixed contact member, and is adjustable about the axis of the stud and lengthwise of the spiral edge 27 of the annular fixed contact member. In the present instance the inner end of the resilient member is bent about the stud and rigidly secured thereto and is clamped between the short tube of insulating material 33 and a small nut 34 threaded onto the rod, thus holding the stud against axial movement and maintaining the resilient member in such a position with relation to the annular contact member that the natural resilience of the resilient member will maintain it out of contact with the inclined edge of the annular member. The resilient member 31 is provided at its outer end with a hook shaped portion 34a arranged to engage the fishing line adjacent the reel, the arrangement being such that a forward pull on the line will flex the resilient member and move the same into contact with the inclined edge of the annular contact member, thereby closing the circuit through the signal.

The resilient contact member may be rotatably adjusted with relation to the fixed contact member in any suitable manner but preferably the contacting portions of the two contact members are enclosed in a cap 35 through which the outer end portion of the stud extends, the cap being clamped against the end of the casing by a nut 36 on the stud. The cap is free to rotate on the stud and is provided in its cylindrical portion with a slot 37 through which the resilient member 31 extends and which serves as a guide for that member. Thus the rotation of the cap will adjust the resilient member lengthwise of the spiral edge of the annular member to positions spaced different distances therefrom. The cap may be held against movement by means of the nut 36 but I prefer to provide a portion of that edge of the cap which is adjacent the casing with a plurality of teeth or serrations 38 for engagement by a small tooth 39 which projects lengthwise from the adjacent portion of the casing. Preferably a spring 40 is interposed between the nut 36 and the end wall of the cap to yieldably retain the serrations 38 in engagement with the tooth 39, thus firmly resisting the rotation of the cap and the resilient member but permitting the cap to be released for adjusting movement by an outward pull thereon.

It will be apparent from the foregoing description that the resiliency of the contact member 31 retains the same normally out of engagement with the annular contact member and that a pull on the fishing line 13 will flex the resilient member into engagement with the annular member and close the circuit through the lamp, and that the force of the pull on the line necessary to close the circuit depends on the distance between the contact members and may be regulated by the adjustment of the resilient member along the spiral edge of the annular member.

Preferably that portion of the contact member 31 which extends radially beyond the casing is provided with a cover 41 of insulating material, this being for the purpose of preventing the closing of the lamp circuit should the metallic end of the resilient member and the casing 15 simultaneously engage the metallic wall of a tackle box, or other conducting part.

While I have shown one embodiment of my invention I wish it to be understood that I do not desire to be limited to the details thereof as various modifications may occur to a person skilled in the art.

Having now fully described my invention what I claim as new and desire to secure by Letters Patent is:

1. A circuit controlling device for an apparatus including a supporting structure, an electrically operable element and a battery to energize said element, said device comprising an annular contact member supported on said structure and having a spiral contact edge, and a second contact member supported on said structure and having one end mounted substantially at the axis of said annular member, extending across said spiral edge of the latter and biased from said edge, said second member having at its other end a part by which it may be actuated to move the same into engagement with said spiral edge of said annular member, one of said members being adjustable to vary the distance between said second contact member and the spiral edge of said annular contact member.

2. A circuit controlling device for an apparatus including a supporting structure, an electrically operable element and a battery to energize said element, said device comprising an annular contact member supported on said structure and having a spiral contact edge, and a second contact member supported on said structure, having one end mounted substantially in line with the axis of said annular member for adjustment about said axis, extending across said spiral edge of said annular member and biased from the latter, said second member having at its other end a part by which it may be actuated to move the same into engagement with said spiral edge of said annular member.

3. A circuit controlling device for an apparatus including a supporting structure, an electrically operable element and a battery to energize said element, said device comprising an annular contact member supported on said structure and having a spiral contact edge, a second contact member supported on said structure, having one end mounted on an axis substantially parallel with the axis of said annular member for adjustment about its said axis, extending across said spiral edge of said annular member and biased from said edge, said member having at its other end a part by which it may be actuated to move the same into engagement with said spiral edge of said annular member, and a device mounted on said structure and having means to guide said second member toward and from said spiral edge of said annular member, the last mentioned device being adjustable to move said second member along said spiral edge and retain the same in the position to which it has been adjusted.

4. A circuit controlling device for an apparatus including a supporting structure, an electrically operable element and a battery to energize said element, said device comprising an annular contact member supported by said structure and having a spiral contact edge, means for electrically connecting said contact member with said element, a conducting stud extending through and insulated from said annular member, means for electrically connecting said stud with said battery, a resilient contact member mounted on and electrically connected with said stud and adjustable about the axis of said stud, said resilient member extending radially across the spiral edge of said annular member, being biased from the same and having at its outer end a part by which it may be moved into engagement with the spiral edge of said annular member, and means for retaining said resilient member in adjusted positions with relation to said spiral edge.

5. A circuit controlling device for an apparatus including a supporting structure, an electrically operable element and a battery to energize said element, said device comprising an annular contact member supported by said structure and having a spiral contact edge, means for electrically connecting said contact member with said element, a conducting stud extending through and insulated from said annular member, means for electrically connecting said stud with said battery, a resilient contact member mounted on and electrically connected with said stud and adjustable about the axis of the latter, said resilient member extending radially across said spiral edge of said annular member, being biased from the same and having at the outer end thereof a part by which it may be moved into engagement with said spiral edge of said annular member, a member supported on said stud for movement about the axis thereof and connected with said resilient contact member to adjust the same lengthwise of said edge of said annular contact member, and means for retaining said resilient member in adjusted positions with relation to said edge of said annular member.

6. A circuit controlling device for an apparatus including a supporting structure, an electrically operable element and a battery to energize said element, said device comprising an annular contact member supported by said structure and having a spiral contact edge, means for electrically connecting said contact member with said element, a rotatable conducting stud extending through and insulated from said annular member, means for electrically connecting said stud with said battery, a resilient contact member electrically connected with said stud and rigidly secured thereto for adjustment about the axis thereof, frictional means for resisting the movement of said stud, said resilient member extending radially across said spiral edge of said annular member, being biased from the same and having at the outer end thereof a part by which it may be flexed into engagement with said spiral edge of said annular member, and means for positively retaining said resilient member in adjusted positions with relation to said spiral edge.

7. A circuit controlling device for an aparatus including a supporting structure, an electrically operable element and a battery to energize said element, said device comprising an annular contact member supported by said structure and having a spiral contact edge, means for electrically connecting said contact member with said element, a rotatable conducting stud extending through and insulated from said annular member, means for electrically connecting said stud with said battery, an elongate resilient contact member electrically connected with said stud and adjustable about the axis thereof, said resilient member extending radially across said spiral edge of said annular member, being biased from the same and having at the outer end thereof a part by which it may be flexed into engagement with said spiral edge of said annular member, and a cup-shaped member rotatably supported on said stud and having a slot through which said resilient member extends, said cup-shaped member and said stud having parts co-operating to normally prevent the rotation of said stud.

8. A circuit controlling device for an apparatus including a supporting structure, an electrically operable element and a battery to energize said element, said device comprising an annular contact member supported by said stud and having a spiral contact edge, means for electrically connecting said contact member with said element, a conducting stud extending through and insulated from said annular member, means for electrically connecting said stud to said battery, a resilient contact member mounted on and electrically connected with said stud and adjustable about the axis thereof, said resilient member extending radially across said spiral edge of said annular member, being biased from the same and having on the outer end thereof a part by which it may be flexed into engagement with said spiral edge, means for retaining said resilient member in adjusted positions with relation to said spiral edge, and an insulating cover for the outer portion of said resilient member.

RAYMOND J. SCHENKEL.

REFERENCES CITED

The following references are of record in the file of this patent:

UNITED STATES PATENTS

| Number | Name | Date |
| --- | --- | --- |
| 1,737,921 | Derr | Dec. 3, 1929 |
| 1,815,662 | Bacon | July 21, 1931 |
| 2,195,692 | Bushey | Apr. 2, 1940 |
| 2,196,784 | Simmons et al. | Apr. 9, 1940 |
| 2,443,441 | Birge | June 15, 1948 |
| 2,446,427 | Linder | Aug. 3, 1948 |
| 2,476,633 | Sohr | July 19, 1949 |
| 2,538,788 | Massino | Jan. 23, 1951 |